(No Model.)
C. M. CARR.
DENTAL BRIDGE WORK.
No. 581,335. Patented Apr. 27, 1897.
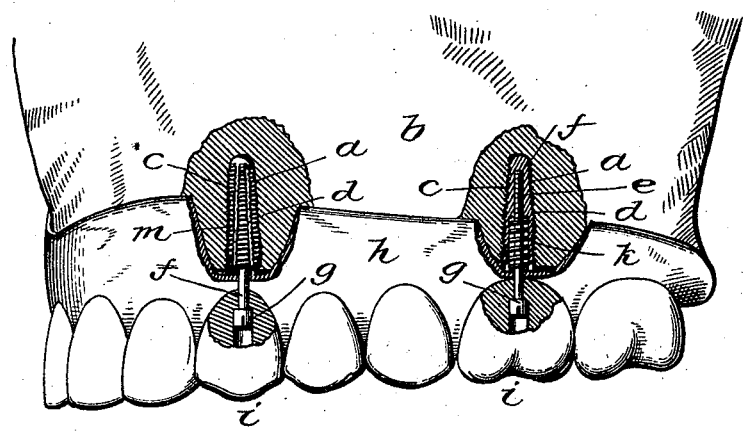
Witnesses
Inventor
Cassius M. Carr
By Attorneys

UNITED STATES PATENT OFFICE.

CASSIUS M. CARR, OF EUREKA, UTAH.

DENTAL BRIDGEWORK.

SPECIFICATION forming part of Letters Patent No. 581,335, dated April 27, 1897.

Application filed November 11, 1892. Serial No. 451,680. (No model.)

*To all whom it may concern:*

Be it known that I, CASSIUS M. CARR, a citizen of the United States, residing at Eureka, in the county of Juab and Territory of Utah, have invented certain new and useful Improvements in Dental Bridgework; and I do declare the following to be a full, clear, and exact description of the invention, such as will enable others skilled in the art to which it appertains to make and use the same, reference being had to the accompanying drawing, and to the letters of reference marked thereon, which forms a part of this specification.

My invention relates to that branch of dentistry wherein the artificial teeth are applied upon the bridge or crown work system.

The object of my device is to so construct the tooth-anchorage that the objectionable suction-plate will not have to be used, and so that the denture will be permitted to press upon and move back and forth in unison with the elasticity of the gums at points between the anchorage. This object is attained by means of a peculiar kind of anchoring device or devices in combination with a cushion adapted to be interposed between the root or pier and the denture in the manner more fully described hereinafter.

In the old method of setting a bridge three or four teeth are fixed rigidly to one old root by cement, thereby compelling that root, which when alive was only able to support its own crown, to sustain the pressure of mastication of several artificial teeth. This excessive and unnatural pressure causes irritation, inflammation, and the early loss of the tooth or teeth to which the bridge is attached. These disadvantages are overcome in my invention by making a bridge or roofless plate and then attaching it to the root or pier in such a way that the pressure of mastication is distributed evenly on the roots and the toothless gums intervening between the roots, the denture being removable and so attached that it is impossible for it to fall down or out while eating or talking.

The accompanying drawing illustrates an enlarged view of a jaw having a denture attached thereto according to my invention, parts being broken away and shown in section in order to better show their construction.

To accomplish these results, I first bore holes $a$ in a root or pier $c$ and apply a filling of gold or other suitable material to the interior thereof. This filling or center is bored to form interior threads $e$ to receive a screw $f$, provided with a head $g$ at its outer end. This head is for the purpose of engaging and loosely holding the denture or artificial teeth $i$, so that it will move toward and away from the root and gums. The teeth are attached to an artificial bridge or roofless gold plate $h$, having holes $h'$ therein which register with the screw-holes in the roots. The screws $f$ are rigidly inserted in the root and pass through the holes in the plate and teeth and also through a spiral spring $k$, which encircles the screw, and thence into the interior of the filling in the post $c$. The outer or free end of the spring comes in contact with the denture to resist inward pressure, while the inner end of the spring bears upon a shoulder within the root or post. The screw cannot be screwed up to draw and adjust the denture the proper degree against the intervening gums and to allow the proper pressure upon the roots. The head of the screw is by preference countersunk in the tooth or plate through which it passes, so that the countersink can be afterward filled at the top to prevent the ingress of food. This filling can be easily removed for the purpose of adjusting or removing the denture.

It will be observed that the interposition of a spiral spring between the root and the denture relieves the roots from rigid pressure during mastication, which is not the case when the bridge is cemented firmly thereto. This makes the action of the artificial bridge or plate during mastication resemble nature as nearly as possible.

What I claim as new, and desire to secure by Letters Patent, is—

As an improvement in the art of dentistry, the combination with a screw or pin attachable to a root, of a denture loosely held on the root by the screw and a cushioning-spring interposed between the denture and root, whereby the denture is free to vibrate back and forth on the root and gums collectively during mastication substantially as described.

In testimony whereof I affix my signature in presence of two witnesses.

CASSIUS M. CARR.

Witnesses:
ROBERT WENDT,
WILLIAM LAPHAM.